(12) United States Patent
Rajhansa et al.

(10) Patent No.: US 11,831,972 B2
(45) Date of Patent: *Nov. 28, 2023

(54) VEHICULAR VISION SYSTEM WITH ADAPTIVE FIELD OF VIEW

(71) Applicant: MAGNA ELECTRONICS INC., Auburn Hills, MI (US)

(72) Inventors: Harshad P. Rajhansa, Rochester Hills, MI (US); Sai Sunil Charugundla Gangadhar, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,437

(22) Filed: Feb. 20, 2023

(65) Prior Publication Data

US 2023/0209170 A1 Jun. 29, 2023

Related U.S. Application Data

(63) Continuation of application No. 17/648,002, filed on Jan. 14, 2022, now Pat. No. 11,588,963, which is a
(Continued)

(51) Int. Cl.
| | |
|---|---|
| *H04N 23/58* | (2023.01) |
| *H04N 7/18* | (2006.01) |
| *B60R 1/00* | (2022.01) |
| *H04N 23/69* | (2023.01) |
| *H04N 23/63* | (2023.01) |

(Continued)

(52) U.S. Cl.
CPC ............... *H04N 23/58* (2023.01); *B60R 1/00* (2013.01); *H04N 7/183* (2013.01); *H04N 23/634* (2023.01); *H04N 23/6811* (2023.01); *H04N 23/69* (2023.01); *H04N 23/698* (2023.01); *H04N 25/44* (2023.01); *B60R 2300/101* (2013.01); *B60R 2300/307* (2013.01); *B60R 2300/605* (2013.01); *B60R 2300/802* (2013.01); *H04N 25/76* (2023.01)

(58) Field of Classification Search
CPC .......... B60R 1/00; H04N 23/58; H04N 23/69; H04N 23/634; H04N 23/6811; H04N 23/698; H04N 25/44; H04N 7/183
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| (Continued) | | |

*Primary Examiner* — On S Mung
(74) *Attorney, Agent, or Firm* — HONIGMAN LLP

(57) ABSTRACT

A vehicular vision system includes a camera fixedly mounted at a vehicle. The camera has a central viewing axis that bisects a total available field of view exterior of the vehicle of the camera into an at least 90 degrees zone to the left and to the right of the central viewing axis. During a driving maneuver of the vehicle, a video display screen displays video images representative of a reduced field of view of the camera that is less than the total available field of view exterior of the vehicle. During the driving maneuver of the vehicle, and as the steering angle of the vehicle is adjusted toward the right side or left side of the vehicle, the reduced field of view of the camera digitally pans toward the respective right side or left side of the total available field of view exterior of the vehicle of the camera.

21 Claims, 3 Drawing Sheets

Related U.S. Application Data continuation of application No. 15/286,683, filed on Oct. 6, 2016, now Pat. No. 11,228,700.

(60) Provisional application No. 62/238,425, filed on Oct. 7, 2015.

(51) Int. Cl.
  *H04N 23/698* (2023.01)
  *H04N 23/68* (2023.01)
  *H04N 25/44* (2023.01)
  *H04N 25/76* (2023.01)

(56) References Cited

U.S. PATENT DOCUMENTS

| | | |
|---|---|---|
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,929,786 A | 7/1999 | Schofield et al. |
| 5,949,331 A | 9/1999 | Schofield et al. |
| 6,049,171 A | 4/2000 | Stam et al. |
| 6,049,619 A | 4/2000 | Anandan et al. |
| 6,052,124 A | 4/2000 | Stein et al. |
| 6,091,833 A | 7/2000 | Yasui et al. |
| 6,100,811 A | 8/2000 | Hsu et al. |
| 6,104,552 A | 8/2000 | Thau et al. |
| 6,144,022 A | 11/2000 | Tenenbaum et al. |
| 6,169,940 B1 | 1/2001 | Jitsukata et al. |
| 6,173,222 B1 | 1/2001 | Seo et al. |
| 6,201,642 B1 | 3/2001 | Bos |
| 6,218,960 B1 | 4/2001 | Ishikawa et al. |
| 6,226,061 B1 | 5/2001 | Tagusa |
| 6,246,961 B1 | 6/2001 | Sasaki et al. |
| 6,249,214 B1 | 6/2001 | Kashiwazaki |
| 6,259,423 B1 | 7/2001 | Tokito et al. |
| 6,266,082 B1 | 7/2001 | Yonezawa et al. |
| 6,285,393 B1 | 9/2001 | Shimoura et al. |
| 6,285,778 B1 | 9/2001 | Nakajima et al. |
| 6,292,111 B1 | 9/2001 | Ishikawa et al. |
| 6,302,545 B1 | 10/2001 | Schofield et al. |
| 6,320,282 B1 | 11/2001 | Caldwell |
| 6,396,397 B1 | 5/2002 | Bos et al. |
| 6,498,620 B2 | 12/2002 | Schofield et al. |
| 6,523,964 B2 | 2/2003 | Schofield et al. |
| 6,542,840 B2 | 4/2003 | Okamoto et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,580,996 B1 | 6/2003 | Friedrich |
| 6,587,573 B1 | 7/2003 | Stam et al. |
| 6,589,625 B1 | 7/2003 | Kothari et al. |
| 6,593,011 B2 | 7/2003 | Liu et al. |
| 6,611,202 B2 | 8/2003 | Schofield et al. |
| 6,611,610 B1 | 8/2003 | Stam et al. |
| 6,631,316 B2 | 10/2003 | Stam et al. |
| 6,631,994 B2 | 10/2003 | Suzuki et al. |
| 6,671,607 B2 | 12/2003 | Shizu et al. |
| 6,690,268 B2 | 2/2004 | Schofield et al. |
| 6,691,008 B2 | 2/2004 | Kondo et al. |
| 6,700,605 B1 | 3/2004 | Toyoda et al. |
| 6,704,621 B1 | 3/2004 | Stein et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,748,312 B2 | 6/2004 | Russell et al. |
| 6,757,109 B2 | 6/2004 | Bos |
| 6,802,617 B2 | 10/2004 | Schofield et al. |
| 6,806,452 B2 | 10/2004 | Bos et al. |
| 6,807,287 B1 | 10/2004 | Hermans |
| 6,813,371 B2 | 11/2004 | Kakinami |
| 6,822,563 B2 | 11/2004 | Bos et al. |
| 6,823,241 B2 | 11/2004 | Shirato et al. |
| 6,864,930 B2 | 3/2005 | Matsushita et al. |
| 6,882,287 B2 | 4/2005 | Schofield |
| 6,891,563 B2 | 5/2005 | Schofield et al. |
| 6,909,753 B2 | 6/2005 | Meehan et al. |
| 6,917,693 B1 | 7/2005 | Kiridena et al. |
| 6,941,216 B2 | 9/2005 | Isogai et al. |
| 6,946,978 B2 | 9/2005 | Schofield |
| 6,975,775 B2 | 12/2005 | Rykowski et al. |
| 7,005,974 B2 | 2/2006 | McMahon et al. |
| 7,038,577 B2 | 5/2006 | Pawlicki et al. |
| 7,049,945 B2 | 5/2006 | Breed et al. |
| 7,062,300 B1 | 6/2006 | Kim |
| 7,065,432 B2 | 6/2006 | Moisel et al. |
| 7,113,867 B1 | 9/2006 | Stein |
| 7,133,661 B2 | 11/2006 | Tatae et al. |
| 7,149,613 B2 | 12/2006 | Stam et al. |
| 7,151,844 B2 | 12/2006 | Stevenson et al. |
| 7,151,996 B2 | 12/2006 | Stein |
| 7,227,611 B2 | 6/2007 | Hull et al. |
| 7,295,682 B2 | 11/2007 | Otsuka et al. |
| 7,375,803 B1 | 5/2008 | Bamji |
| 7,423,821 B2 | 9/2008 | Bechtel et al. |
| 7,502,048 B2 | 3/2009 | Okamoto et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,720,580 B2 | 5/2010 | Higgins-Luthman |
| 7,729,580 B2 | 6/2010 | Tanaka et al. |
| 7,786,898 B2 | 8/2010 | Stein et al. |
| 7,843,451 B2 | 11/2010 | Lafon |
| 7,855,755 B2 | 12/2010 | Weller et al. |
| 7,855,778 B2 | 12/2010 | Yung et al. |
| 7,859,565 B2 | 12/2010 | Schofield et al. |
| 7,872,764 B2 | 1/2011 | Higgins-Luthman et al. |
| 7,881,496 B2 | 2/2011 | Camilleri et al. |
| 7,914,187 B2 | 3/2011 | Higgins-Luthman et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,027,029 B2 | 9/2011 | Lu et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,224,031 B2 | 7/2012 | Saito |
| 8,233,045 B2 | 7/2012 | Uo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,553,088 B2 | 10/2013 | Stein et al. |
| 8,694,224 B2 | 4/2014 | Chundrlik, Jr. et al. |
| 11,228,700 B2 | 1/2022 | Rajhansa et al. |
| 11,588,963 B2 | 2/2023 | Rajhansa et al. |
| 2002/0005778 A1 | 1/2002 | Breed et al. |
| 2002/0011611 A1 | 1/2002 | Huang et al. |
| 2002/0080235 A1 | 6/2002 | Jeon |
| 2003/0052773 A1 | 3/2003 | Sjonell |
| 2003/0103142 A1 | 6/2003 | Hitomi et al. |
| 2005/0237385 A1 | 10/2005 | Kosaka et al. |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2008/0043099 A1 | 2/2008 | Stein et al. |
| 2008/0266396 A1 | 10/2008 | Stein |
| 2009/0290032 A1 | 11/2009 | Zhang et al. |
| 2012/0045112 A1 | 2/2012 | Lundblad et al. |
| 2012/0069185 A1 | 3/2012 | Stein |
| 2012/0176528 A1 | 7/2012 | Denny et al. |
| 2012/0200707 A1 | 8/2012 | Stein et al. |
| 2012/0314071 A1 | 12/2012 | Rosenbaum et al. |
| 2012/0320209 A1 | 12/2012 | Vico et al. |
| 2013/0141580 A1 | 6/2013 | Stein et al. |
| 2013/0147957 A1 | 6/2013 | Stein |
| 2013/0169812 A1 | 7/2013 | Lu et al. |

(56) References Cited

U.S. PATENT DOCUMENTS

| | | |
|---|---|---|
| 2013/0286193 A1 | 10/2013 | Pflug |
| 2014/0022378 A1 | 1/2014 | Higgins-Luthman |
| 2014/0043473 A1 | 2/2014 | Gupta et al. |
| 2014/0055616 A1 | 2/2014 | Corcoran et al. |
| 2014/0063254 A1 | 3/2014 | Shi et al. |
| 2014/0098229 A1 | 4/2014 | Lu et al. |
| 2014/0247352 A1 | 9/2014 | Rathi et al. |
| 2014/0313339 A1 | 10/2014 | Diessner |
| 2014/0320658 A1 | 10/2014 | Pliefke |
| 2014/0333729 A1 | 11/2014 | Pflug |
| 2014/0340510 A1 | 11/2014 | Ihlenburg et al. |
| 2014/0347486 A1 | 11/2014 | Okouneva |
| 2014/0350834 A1 | 11/2014 | Turk |

VEHICULAR VISION SYSTEM WITH ADAPTIVE FIELD OF VIEW

CROSS REFERENCE TO RELATED APPLICATIONS

The present application is a continuation of U.S. patent application Ser. No. 17/648,002, filed Jan. 14, 2022, now U.S. Pat. No. 11,588,963, which is a continuation of U.S. patent application Ser. No. 15/286,683, filed Oct. 6, 2016, now U.S. Pat. No. 11,228,700, which claims the filing benefits of U.S. provisional application Ser. No. 62/238,425, filed Oct. 7, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides an adaptive field of view for a fixed camera, such as for a fixedly mounted rearward viewing camera having a fixed field of view. The camera may have a wide angle lens that provides a total available field of view of up to about 180 degrees or more, but the camera or image processor may only use a portion or sub-array representative of a portion or region of the full field of view, such as a region of about 135 degrees (about 67.5 degrees (+/- about 10 degrees) to either side of a central or principal viewing axis of the imager and lens). The system of the present invention utilizes image processing of image data captured by the imager to digitally pan or sweep or extend the implemented field of view based on the steering wheel angle over the entire available field of view of the camera lens.

Thus, the system provides for reduced image processing by processing image data captured by only a portion or sub-array of the pixelated imaging array. The system also provides enhancement in the visibility rearward of the vehicle to the driver of the vehicle (viewing the displayed captured images) due to utilization of the captured image data representative of the region of interest, depending on the direction of travel, and the increase or change in the region of interest (reduced field of view).

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
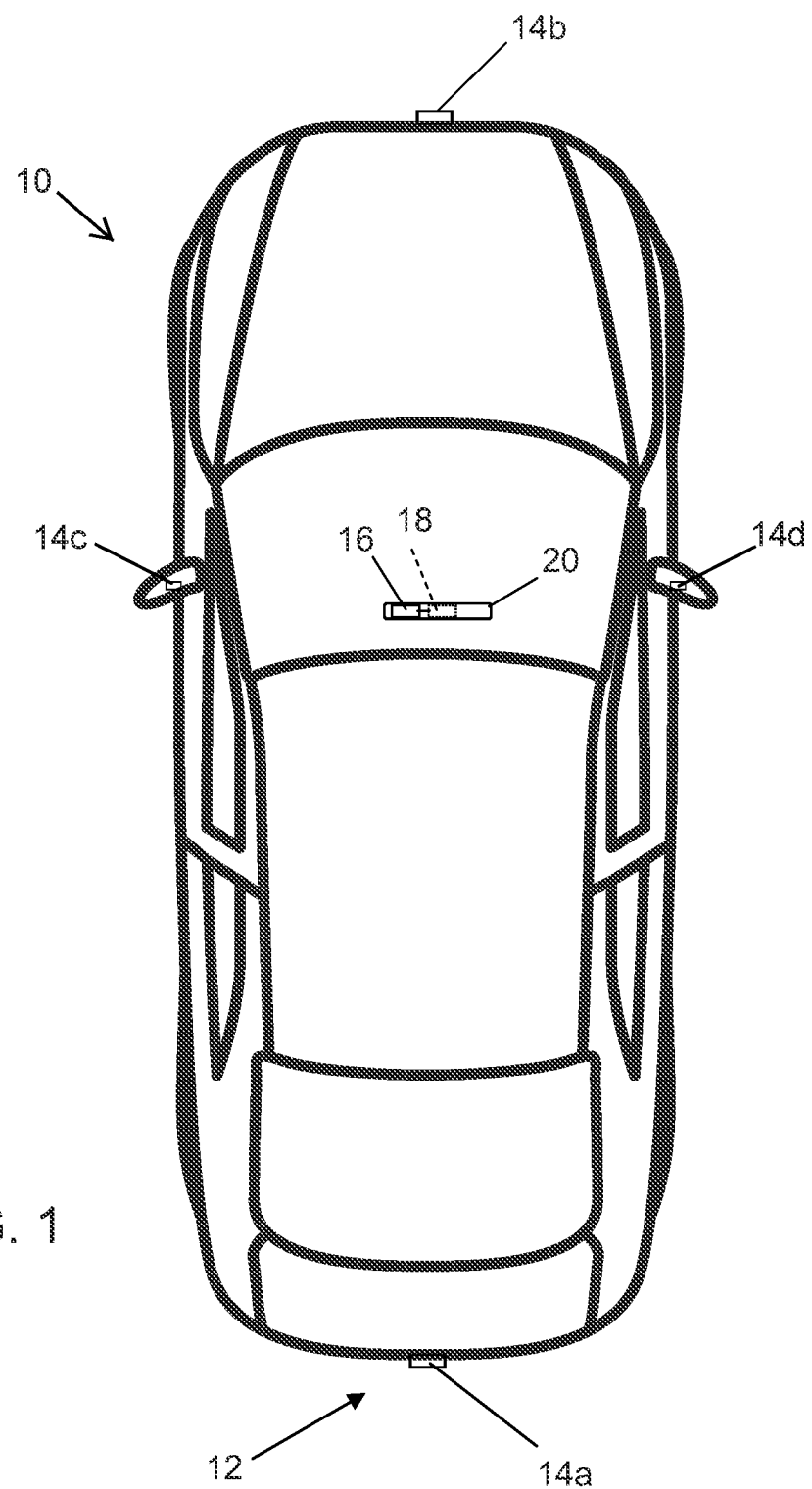
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
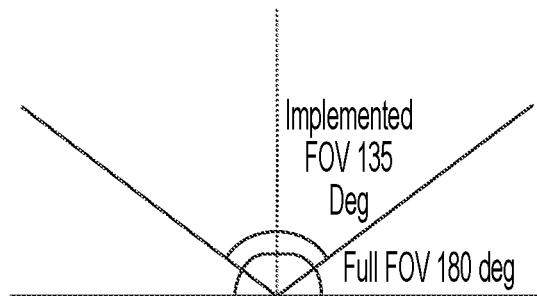
FIG. 2 is a schematic of the field of view of a rearward viewing camera, showing the camera's full field of view and its implemented field of view.

The driver assist system of the present invention provides an adjustable field of view of the camera (such as a rearward viewing camera at the rear of the vehicle and having a wide angle or fisheye lens that provides about a 180 degree field of view), with the camera fixedly mounted at or disposed at the vehicle. As shown in FIG. 2, the lens may provide a full field of view (FOV) of about 180 degrees (or more or less than about 180 degrees depending on the particular lens and application), and the imager or imaging array of the camera may capture image data representative of the full 180 degree FOV. An image processor may process only a portion of the captured image data (such as a sub-array of photosensing elements of the imager or imaging array of the camera) representative of a narrower or effective or implemented FOV (such as about 135 degrees centered about a principal viewing axis of the camera). Such processing of only a portion of the captured image data reduces processing requirements and processes image data representative of a region of interest rearward of vehicle when the vehicle is traveling or reversing in a generally straight line.

Figure 3:
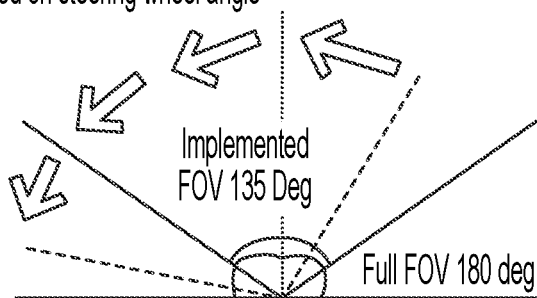
FIG. 3 is a schematic of the field of view of the rearward viewing camera, showing the effective or implemented field of view shifted to the left based on the steering wheel angle of the vehicle.
Figure 4:
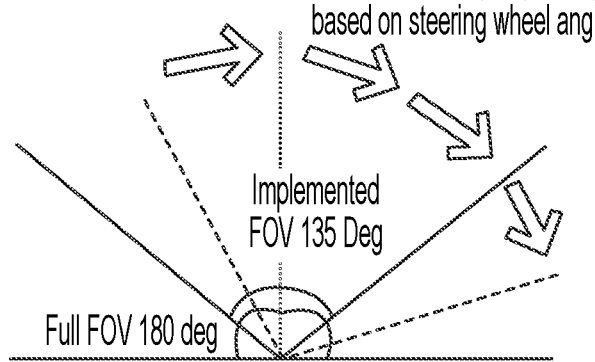
FIG. 4 is a schematic of the field of view of the rearward viewing camera, showing the effective or implemented field of view shifted to the right based on the steering wheel angle of the vehicle.

When the steering angle of the vehicle is changed (via the driver turning the steering wheel in either direction) during a reversing maneuver, the image processor and vision system of the present invention adjusts processing of captured image data to digitally pan or sweep or extend the implemented or effective FOV toward one side or the other, depending on the steering direction. For example, and such as shown in FIGS. 3 and 4, the image processor may adjust image data processing by shifting the about 135 degree reduced or implemented or effective FOV toward one side or the other, such as by shifting the center or principal viewing axis of the reduced field of view towards one side or the other of the center axis of the full field of view. For example, and such as shown in FIG. 3, the system may expand the field of view toward the left side while reducing the field of view at the right side (or shifting the right border of the field of view towards the center axis of the camera), responsive to the vehicle turning in a left direction during a reversing maneuver. Similarly, for example, and such as shown in FIG. 4, the system may expand the field of view toward the right side while reducing the field of view at the left side (or shifting the left border of the field of view towards the center axis of the camera), responsive to the vehicle turning in a right direction during a reversing maneuver.

For example, the camera may comprise a wide angle lens providing the field of view, and the camera captures an image data set representative of the field of view of the camera when the camera is disposed at the vehicle. An image processor is operable to process image data captured by the camera, and processes a sub-set of the image data set that is representative of a sub-portion of the field of view of the camera (that is less than the full field of view of said camera). The sub-set of the image data set that is processed by the image processor is determined based on steering of the vehicle, such that the sub-set is determined or adjusted or selected as the steering of the vehicle changes. For example, if the vehicle is steered to the left, the sub-set of the image data set that is processed by the image processor is a sub-set that is towards the left side or that represents a left sub-portion of the field of view of the camera.

Optionally, the determined sub-set of the image data set may be determined by determining or selecting a sub-set of the image data set that is representative of a sub-portion of the field of view that has a principal axis extending sideward of the vehicle that corresponds to the direction in which the vehicle is steered. The sub-set of image data may be continuously determined or selected or adjusted as the steering changes, such that the processed sub-set of image data changes corresponding to steering changes of the vehicle (so that the image processor is processing image data at a region generally centered around the direction of steering of the vehicle at that time).

Similarly, the system may include a display that displays images derived from a sub-set of the image data set representative of a sub-portion of the field of view of the camera that is less than the field of view of said camera. The sub-set of the image data set that represents the displayed sub-portion of the field of view of the camera is determined based on steering of the vehicle. For example, if the vehicle is steered to the left, the images that are displayed are representative of a sub-set that is towards the left side or that represents a left sub-portion of the field of view of the camera.

Optionally, the determined sub-set of the image data set may be determined by determining or selecting a sub-set of the image data set that is representative of a sub-portion of the field of view that has a principal axis extending sideward of the vehicle that corresponds to the direction in which the vehicle is steered. The sub-set of image data may be continuously determined or selected or adjusted as the steering changes, such that the displayed images change (i.e., the sub-portion of the field of view changes) corresponding to steering changes of the vehicle (so that the display is displaying images representative of a field of view generally centered around the direction of steering of the vehicle at that time).

The system thus may continuously or intermittently or episodically determine the current steering direction of the vehicle and may select or determine a sub-set of image data that is representative of a sub-portion field of view that has its principal or center axis aimed or along the current steering direction. As the steering direction changes, a different sub-set of image data is selected or determined, with the different or new sub-set of image data having its principal or center axis aimed or along the then current steering direction. The sub-set of image data may be processed by an image processor for enhanced object detection in the sub-portion of the field of view and/or the sub-set of image data may be used to display the sub-portion of the field of view associated with or captured by the determined sub-set of image data.

By sweeping/panning the implemented sub-FOV across the range of available FOV based on the direction of the steering wheel angle rotation, either left or right, the system processes image data representative of the region of interest rearward of the vehicle and reduces processing requirements by not processing image data representative of other areas (such as regions or areas at the opposite side of the vehicle from the turning direction). The image processor processes image data captured by a selected or appropriate portion or sub-array of the imaging array sensor (such as a smaller or reduced two dimensional array of photosensing sensors selected from the larger two dimensional array of photosensing sensors of the imager).

Figure 5:
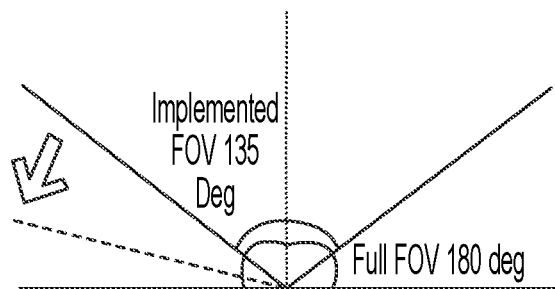
FIG. 5 is a schematic of the field of view of the rearward viewing camera, showing the effective or implemented field of view widened or expanded at the left side based on the steering wheel angle of the vehicle.
Figure 6:
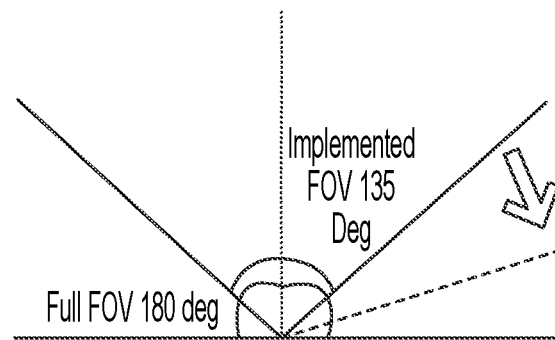
FIG. 6 is a schematic of the field of view of the rearward viewing camera, showing the effective or implemented field of view widened or expanded at the right side based on the steering wheel angle of the vehicle.

Optionally, and with reference to FIGS. 5 and 6, the system may expand or contract the effective or implemented FOV on one side, based on the direction of steering wheel rotation, while keeping the other side fixed at its original position. The system thus expands the implemented FOV to include the region of interest at the side towards which the vehicle is turning during a reversing maneuver. For example, and such as shown in FIG. 5, when the steering wheel angle is turned to the left, the image processor may process image data captured by the fixed FOV sub-array (spanning the about 135 degree FOV) and may process image data captured by the imager that is representative of the region toward the left side of the vehicle to expand the implemented FOV to include a greater region at the left side of the vehicle. Similarly, for example, and such as shown in FIG. 6, when the steering wheel angle is turned to the right, the image processor may process image data captured by the fixed FOV sub-array (spanning the about 135 degree FOV) and may process image data captured by the imager that is representative of the region toward the right side of the vehicle to expand the implemented FOV to include a greater region at the right side of the vehicle.

Thus, the present invention provides adjustment of or panning or sweeping or extending the implemented or effective sub-portion of the field of view of a camera, with the adjustment or determination or selection of the sub-FOV being responsive to the steering wheel angle of the vehicle. The adjustment adjusts the implemented or effective or utilized field of view of the camera while the camera itself remains fixedly mounted at the vehicle. The adjustment is achieved via image processing and provides for reduced processing of captured image data and provides enhanced viewing in a desired or appropriate direction without physically moving the camera or imager or lens. The adjustment may result in the processed or effective field of view of the camera extending more towards a side region ahead of the vehicle when the vehicle is steered towards that side. For example, when the driver turns to the right, the system may process image data captured of a right region of the field of view of the camera to enhance object detection in that area.

The system also provides enhanced display of images to the driver of the vehicle (who may view the displayed captured images during a reversing maneuver of the vehicle) due to the system's utilization of the captured image data representative of the region of interest, depending on the direction of travel, and the increase or change in the region of interest (reduced field of view). The display may display images representative of the region of interest as the region changes, and not display images representative of regions not of interest (such as regions at a side of the vehicle opposite of the direction that the vehicle is being steered during a reversing maneuver). Thus, the region of interest may be displayed larger than if displayed with the rest of the captured image (of the full field of view) to provide enhanced viewing by the driver of the vehicle of the actual region of interest during a reversing maneuver (with the driver not viewing regions not of interest or of less interest to the driver during the reversing maneuver).

The driver assistance system thus provides enhanced image data processing and capture of the region of interest rearward of the vehicle depending on the steering angle of the vehicle during a reversing maneuver. The system may be responsive to an input or signal indicative of the steering wheel angle, and may receive such a signal via a vehicle network or communication bus of the vehicle or the like. The captured image data of the region of interest (the region encompassed by the implemented or reduced field of view) may be used for display of that region at a display in the vehicle and viewable by the driver of the vehicle during the reversing maneuver. Optionally, the captured image data of the region of interest may be used for object detection of objects that may be present in the region of interest during the reversing maneuver (whereby the system may also provide an alert or warning responsive to detection of an object rearward of the vehicle in the region of interest during the reversing maneuver).

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/ or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. Nos. 9,041,806 and/or 6,690,268, and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
   a camera fixedly mounted at a vehicle equipped with the vehicular vision system;
   wherein the camera comprises (i) a two dimensional imaging array having at least one million photosensing elements arranged in rows and columns and (ii) a wide angle lens that provides a total available field of view exterior of the vehicle of at least 180 degrees wide;
   wherein the camera has a central viewing axis;
   wherein the central viewing axis of the camera bisects the total available field of view exterior of the vehicle into an at least 90 degrees zone to the left of the central viewing axis and into an at least 90 degrees zone to the right of the central viewing axis;
   a video display screen disposed at the vehicle and viewable by a driver of the vehicle;
   wherein, during a driving maneuver of the vehicle, the video display screen displays video images representative of a reduced field of view of the camera that is less than the total available field of view exterior of the vehicle;
   wherein, during the driving maneuver of the vehicle, and as the steering angle of the vehicle is adjusted toward the right side of the vehicle, the reduced field of view of the camera digitally pans toward the right side of the total available field of view exterior of the vehicle of the camera; and
   wherein, during the driving maneuver of the vehicle, and as the steering angle of the vehicle is adjusted toward the left side of the vehicle, the reduced field of view of the camera digitally pans toward the left side of the total available field of view exterior of the vehicle of the camera.

2. The vehicular vision system of claim 1, wherein the camera is fixedly mounted at a rear portion of the vehicle so as to view at least rearward of the vehicle.

3. The vehicular vision system of claim 2, wherein the driving maneuver of the vehicle comprises a reversing maneuver of the vehicle.

4. The vehicular vision system of claim 3, wherein the camera comprises a rear backup camera of the vehicle.

5. The vehicular vision system of claim 1, wherein the reduced field of view of the camera is not wider than 135 degrees.

6. The vehicular vision system of claim 1, wherein the camera is fixedly mounted at front portion of the vehicle and views forward of the vehicle.

7. The vehicular vision system of claim 6, wherein the driving maneuver of the vehicle comprises a forward driving maneuver of the vehicle.

8. The vehicular vision system of claim 1, wherein the camera is fixedly mounted at an in-cabin side of a windshield of the vehicle and views forward of the vehicle through the windshield.

9. The vehicular vision system of claim 1, wherein, during the driving maneuver of the vehicle, an image processor processes image data captured by the camera to determine presence of an object viewed by the camera.

10. The vehicular vision system of claim 1, wherein the reduced field of view of the camera is digitally panned via adjusting processing of image data captured by the camera.

11. The vehicular vision system of claim 1, wherein the displayed video images representative of the reduced field of view of the camera are centered about where the vehicle is steering toward.

12. A vehicular vision system, the vehicular vision system comprising:
- a rear backup camera fixedly mounted at a rear portion of a vehicle equipped with the vehicular vision system;
- wherein the rear backup camera comprises (i) a two dimensional CMOS imaging array having at least one million photosensing elements arranged in rows and columns and (ii) a wide angle lens that provides a total available field of view rearward of the vehicle of at least 180 degrees wide;
- wherein the rear backup camera has a central viewing axis;
- wherein the central viewing axis of the rear backup camera bisects the total available field of view rearward of the vehicle into an at least 90 degrees zone to the left of the central viewing axis and into an at least 90 degrees zone to the right of the central viewing axis;
- a video display screen disposed at the vehicle and viewable by a driver of the vehicle;
- wherein, during a reversing maneuver of the vehicle, the video display screen displays video images representative of a reduced field of view of the rear backup camera that is less than the total available field of view rearward of the vehicle;
- wherein, during the reversing maneuver of the vehicle, and as the steering angle of the vehicle is adjusted toward the right side of the vehicle, the reduced field of view of the rear backup camera digitally pans toward the right side of the total available field of view rearward of the vehicle of the rear backup camera; and
- wherein, during the reversing maneuver of the vehicle, and as the steering angle of the vehicle is adjusted toward the left side of the vehicle, the reduced field of view of the rear backup camera digitally pans toward the left side of the total available field of view rearward of the vehicle of the rear backup camera.

13. The vehicular vision system of claim 12, wherein the reduced field of view of the rear backup camera is not wider than a 135 degrees.

14. The vehicular vision system of claim 12, wherein, during the reversing maneuver of the vehicle, an image processor processes image data captured by the rear backup camera to determine presence of an object viewed by the rear backup camera.

15. The vehicular vision system of claim 12, wherein the reduced field of view of the rear backup camera is digitally panned via adjusting processing of image data captured by the rear backup camera.

16. The vehicular vision system of claim 12, wherein the displayed video images representative of the reduced field of view of the rear backup camera are centered about where the vehicle is steering toward.

17. A vehicular vision system, the vehicular vision system comprising:
- a front-viewing camera fixedly mounted at a front portion of a vehicle equipped with the vehicular vision system;
- wherein the front-viewing camera comprises (i) a two dimensional CMOS imaging array having at least one million photosensing elements arranged in rows and columns and (ii) a wide angle lens that provides a total available field of view forward of the vehicle of at least 180 degrees wide;
- wherein the front-viewing camera has a central viewing axis;
- wherein the central viewing axis of the front-viewing camera bisects the total available field of view forward of the vehicle into an at least 90 degrees zone to the left of the central viewing axis and into an at least 90 degrees zone to the right of the central viewing axis;
- a video display screen disposed at the vehicle and viewable by a driver of the vehicle;
- wherein, during a driving maneuver of the vehicle, and as the steering angle of the vehicle is adjusted toward the right side of the vehicle, a reduced field of view of the front-viewing camera that is less than the total available field of view forward of the vehicle digitally pans toward the right side of the total available field of view forward of the vehicle of the front-viewing camera; and
- wherein, during the driving maneuver of the vehicle, and as the steering angle of the vehicle is adjusted toward the left side of the vehicle, the reduced field of view of the front-viewing camera digitally pans toward the left side of the total available field of view forward of the vehicle of the front-viewing camera.

18. The vehicular vision system of claim 17, wherein the reduced field of view of the front-viewing camera is not wider than 135 degrees.

19. The vehicular vision system of claim 17, wherein, during the driving maneuver of the vehicle, an image processor processes image data captured by the front-viewing camera to determine presence of an object viewed by the front-viewing camera.

20. The vehicular vision system of claim 17, wherein the reduced field of view of the front-viewing camera is digitally panned via adjusting processing of image data captured by the front-viewing camera.

21. The vehicular vision system of claim 17, wherein the displayed video images representative of the reduced field of view of the front-viewing camera are centered about where the vehicle is steering toward.

* * * * *